United States Patent
Wright et al.

[11] Patent Number: 6,036,321
[45] Date of Patent: Mar. 14, 2000

[54] CRYSTAL ISOLATION HOUSING

[75] Inventors: David Wright, Redwood City; Shinan S. Sheng, Saratoga, both of Calif.; Dennis Reeder, South Jordan, Utah

[73] Assignee: Spectra Physics Lasers, Inc., Mountain View, Calif.

[21] Appl. No.: 08/857,656

[22] Filed: May 16, 1997

[51] Int. Cl.$^7$ .................................. G02B 1/10; H01S 3/07
[52] U.S. Cl. ........................................ 359/513; 372/39
[58] Field of Search .................. 372/41, 66, 39; 359/513

[56] References Cited

U.S. PATENT DOCUMENTS

| | | | |
|---|---|---|---|
| 3,621,273 | 11/1971 | Rorden | 307/88.3 |
| 4,024,466 | 5/1977 | Cremosnik | 331/94.5 |
| 4,968,121 | 11/1990 | Bruesselbach et al. | 350/354 |
| 5,430,756 | 7/1995 | Hanibara | 372/108 |
| 5,497,268 | 3/1996 | Tang | 359/513 |
| 5,539,765 | 7/1996 | Sibbett et al. | 372/92 |
| 5,548,606 | 8/1996 | Senn et al. | 372/41 |
| 5,563,899 | 10/1996 | Meissner et al. | 372/39 |
| 5,606,453 | 2/1997 | Walling et al. | 372/21 |

OTHER PUBLICATIONS

Patent Abstracts of Japan, vol. 014, No. 411 (E–0973) Sep. 5, 2990 (JP 02 156583 A).
Patent Abstracts of Japan, col. 018, No. 174 (E–1530), Mar. 24, 1994. (JP 05 343812 A).

*Primary Examiner*—James W. Davie
*Attorney, Agent, or Firm*—Wilson Sonsini Goodrich & Rosati

[57] ABSTRACT

The crystal isolation system of the present invention protects a laser crystal from environmental factors such as humidity and dust. A crystal is placed in a housing which has two ports in it, and flexible tubes are placed in each port. Cap pieces cover the ends of the tubes and prevent deleterious environmental factors such as dust and moisture from entering the isolation system while allowing laser light to enter the system. A desiccator attached to the system removes moisture from the air inside the system, and an led and detector apparatus are is used to help indicate the remaining useful life of the desiccant in the desiccator.

9 Claims, 4 Drawing Sheets

CRYSTAL ISOLATION HOUSING

BACKGROUND OF THE INVENTION

1. Field of the Invention

The present invention relates to an environmental isolation housing, and more particularly to an environmental isolation housing for a crystal used in a laser system.

2. Description of the Related Art

Crystals used in laser light applications may have some of their critical parameters altered by exposure to environmental factors. For example, Lithium Tri-Borate (LBO) is hydroscopic, and chemically re-acts with water vapor. Typically, when an LBO crystal is used in laser light applications, two opposing faces of the crystal will be polished optically flat, and anti-reflection coated, so that a laser beam will pass through the crystal with very small loss.

The anti-reflection coating can provide a barrier to the water vapor. However, the thermal expansion coefficients of LBO are very high and, at present, no available antireflection coating materials are similar, so very large mechanical stresses occur at the LBO-to-coating interface over the typical 25° C. to 160° C. operating range. At the edges of the coating, and at any tiny defect sites, water molecules may react with the LBO and destroy the bond between the LBO and the coating. This mechanism may damage or destroy the entire coating within a few weeks in a high humidity environment. Although moisture may also be absorbed through the unpolished sides of the crystal, it is absorbed very slowly and typically only causes damage at a greatly reduced rate compared to the damage cause by moisture absorption at the crystal face.

Other environmental factors in the atmosphere can also cause problems for crystals used in lasers. For example, dust particles and some vapors react with laser light in such a manner that they may move along the light beam toward an optical surfaces. Once they are attached to an optical surface they may scatter the light causing loss of power. Also, these contaminant can absorb the light and cause crystal heating that distorts the laser beam wavefront or possibly damages the surface of the crystal via thermally induced stresses.

Typically, optical elements used with laser light have been protected from dust and vapor contamination by sealing the optical elements in a very clean assembly or by purging the assembly with a high-purity gas, usually air or nitrogen.

Complete sealing, using clean room techniques, is satisfactory if no field service or change of the optics is anticipated. A purge gas system allows the optics or other components to be changed in the field. However, it does not protect the optics during shipment or at times when the purge gas system is not operating unless the gas pumping and purification system is a sealed part of the assembly.

Additionally, alignment of the laser optical components is usually very critical, often requiring mechanical alignment and stability within 0.0005°. Complete sealing has the complication that altitude or other atmospheric pressure changes produce substantial forces on the mechanics of the optical system which can misalign them. Very stiff structures or symmetrical designs can be used to counter the pressure changes, but sometimes more deliberate pressure equalizing mechanisms are needed.

Precise alignment of the optical components of a laser is also complicated by the sealing system used. The seals must have controlled flexibility or be adjustable using only small forces.

There is a need for crystal isolation methods which consider all the chemical, optical, and precise mechanical requirements of lasers outlined above.

SUMMARY OF THE INVENTION

It is an object of the invention to provide a system which isolates a crystal from the environment while allowing the crystal to be aligned to a laser beam or as part of a laser system.

It is a further object of the invention to provide a system which can detect the useful age of an atmospheric conditioning system such as the remaining absorptive power of the desiccant in a desiccator.

In one embodiment of the invention the crystal is placed in a housing which has two ports to allow a laser beam to enter and exit the housing. Cap pieces are placed over the input ports in order to seal off the housing from the environment. A desiccator or other air treatment device is then attached to the system to remove unwanted elements from the atmosphere inside the system and those that may leak in over time. A light source is set up to direct light at the contents of the desiccator or air treatment device. Light is reflected from or transmitted by the contents and received by a detector. The amount of light received by the detector can be used to determine the remaining utility of the contents.

In another embodiment of the invention the crystal is again placed in a housing which has two input ports. Flexible tubes are attached to each of the input ports and cap pieces, one or both of which may be mirrors, are placed in the open ends of each of the flexible tubes. A desiccator or other air treatment device is then attached to the system to remove unwanted elements from the atmosphere inside the system and those that may leak in over time. A light source is set up to direct light at the contents of the desiccator or air treatment device. A detector can be set up to receive light reflected from or light transmitted by the contents of the desiccator. The amount of light received by the detector can be used to determine the remaining utility of the contents.

In yet another embodiment of the present invention two of the faces of a crystal are polished optically flat. An optical quality cap piece is then optically contacted onto each of the polished faces of the crystal without the use of any epoxy or other bonding agent. The cap pieces protect the faces of the crystal form dust and moisture.

In another embodiment of the invention, each cap piece is positioned a predetermined distance from a face of the crystal to form an etalon between the face of the crystal and the inside face of the cap piece. A barrier is then placed around a perimeter of the crystal face and the cap piece to prevent unwanted environmental factors from entering the gap between the crystal face and the inside surface of the cap piece.

DETAIL DESCRIPTION

Figure 1:
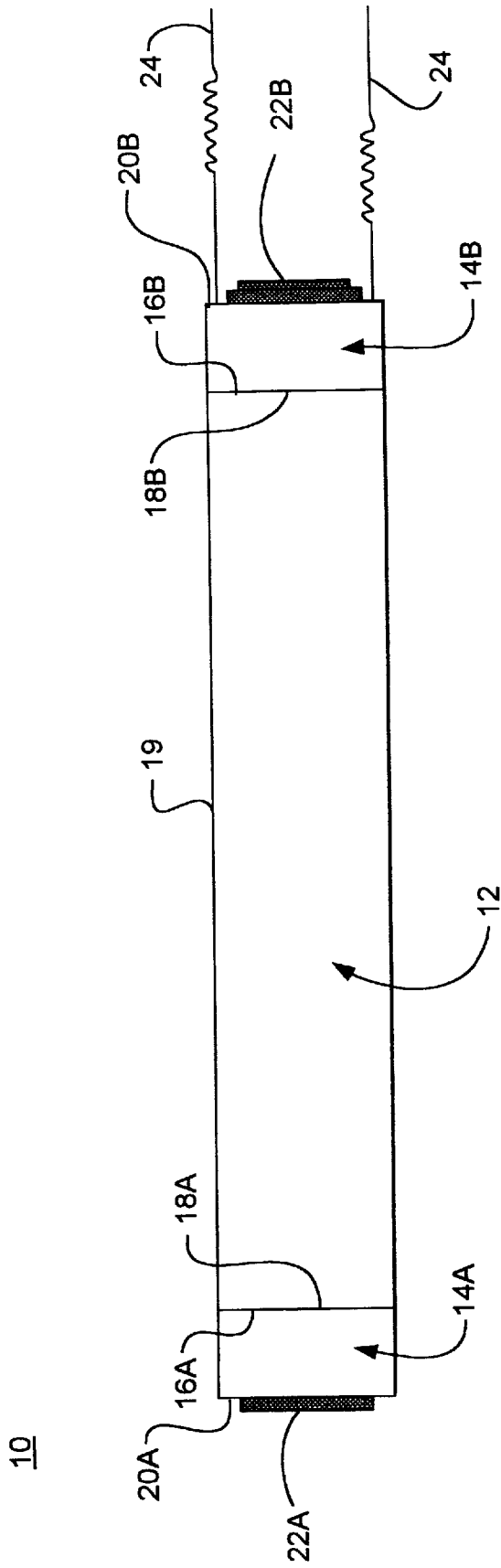
FIG. 1 is an illustration of a crystal isolation system that utilizes two end caps to protect the faces of the crystal.

Referring now to FIG. 1, environmental isolation housing 10 isolates crystal 12 from the environment through the use of two cap pieces 14A and B. Typically, cap pieces 14A and B are be made of a material which transmit the wavelengths of interest and preferably has an index of refraction approximately equal to the index of refraction of crystal 12 at the wavelength of interest in order to help minimize reflections at the interface. In one embodiment of the present invention, crystal 12 is LBO and cap pieces 14 are made of F8 glass. The index of refraction in the y-axis of LBO at 532 nm is 1.6065 and the index of refraction of F8 glass at 532 nm is 1.6088. Thus the index differential between the two material at this wavelength is only 0.0057. It will be appreciated by those skilled in the art that if other types of glass may be used in order to meet different optical, thermal or other material requirements.

Cap pieces 14 can be in any desired shape such as flat or lens-shaped as long as they act as a barrier to the environmental factors of interest such as moisture and dust. Additionally, they can be coated to reduce reflection losses or can they can be partial reflectors or mirrors.

Inside surfaces 16A and B of cap pieces 14 A and B are optically contacted with crystal faces 1 8A and B (respectively) to hold the two surfaces together. One method that can be used to create the optically contacted bond between crystal faces 18 and the cap pieces 14 is as follows. Crystal faces 18 are polished optically flat and inside surfaces 16 are also polished optically flat. Crystal face 18 and inside surface 16 of cap piece 14 are carefully cleaned then pressed into contact for approximately 30 seconds. For surfaces that have atoms that form surface compounds readily, cap pieces 14 will stay in place. The optical bonding procedure can be found in published sources such as *Prism and Lens Making* by F. Twyman (1952) pp. 241 and the references therein. This entire book and the references therein are hereby incorporated by reference.

Crystal 12 may expand or contract in response to temperature changes due to heaters, laser light, or the environment. Crystal 12 and cap pieces 14 may have different thermal expansion coefficients. It may be difficult to find a material for the cap pieces 14 which has both: (1) an index of refraction that is close enough to that of crystal 12 such that the reflections at the interface are tolerable and (2) a thermal expansion coefficient close enough to that of crystal 12 such that cap pieces 14 do not crack or separate during operation of the system. Cap pieces 14 can be made thin enough such that they will expand without cracking as the crystal expands. Thus, cap pieces 14 can be chosen such that an index of refraction is substantially similar to an index of refraction of crystal 12 even if a thermal expansion coefficient of cap pieces 14 are different from a thermal expansion coefficient of crystal 12.

For materials that do not readily form surface compounds, cap pieces 14 may not stay in place on crystal faces 18. In this case, crystal 12 and cap pieces 14 can be held against each other using, for example, springs 24. Other devices for applying the necessary pressing forces over the temperature range of interest can be used and will be readily apparent to those skilled in the art.

The two cap pieces 14A and B act to protect crystal faces 18A and B from undesirable environmental factors such as moisture or dust. Light can enter crystal 12 through cap piece(s) 14 and crystal faces 18 will be protected from environmental factors. Ordinarily, only polished crystal faces 18 of crystal 12 need to be protected from environmental factors such as dust and humidity because the rate at which moisture enters crystal 12 through sides 19 is much slower than the rate at which moisture enters crystal 12 through crystal faces 18. As a result, if only crystal faces 18 are protected from moisture, crystal 12 is effectively protected from deterioration due to moisture in the environment for a long period of time.

Reflection losses from the outside surfaces 20A and B of transparent cap pieces 14 can cause undesirable losses. To help reduce these losses, outside surfaces 20 of transparent cap pieces 14 can have an antireflection coating 22 put on them. Such coating are readily available for most optical Classes but are not as available for crystals such as LBO.

The portion of crystal 12 not covered by transparent end pieces 14 may be covered with a coating or a material in order to isolate the rest of the crystal from the environment. This may be desirable for certain types of crystals that are highly hydroscopic such as sodium chloride.

Figure 2:
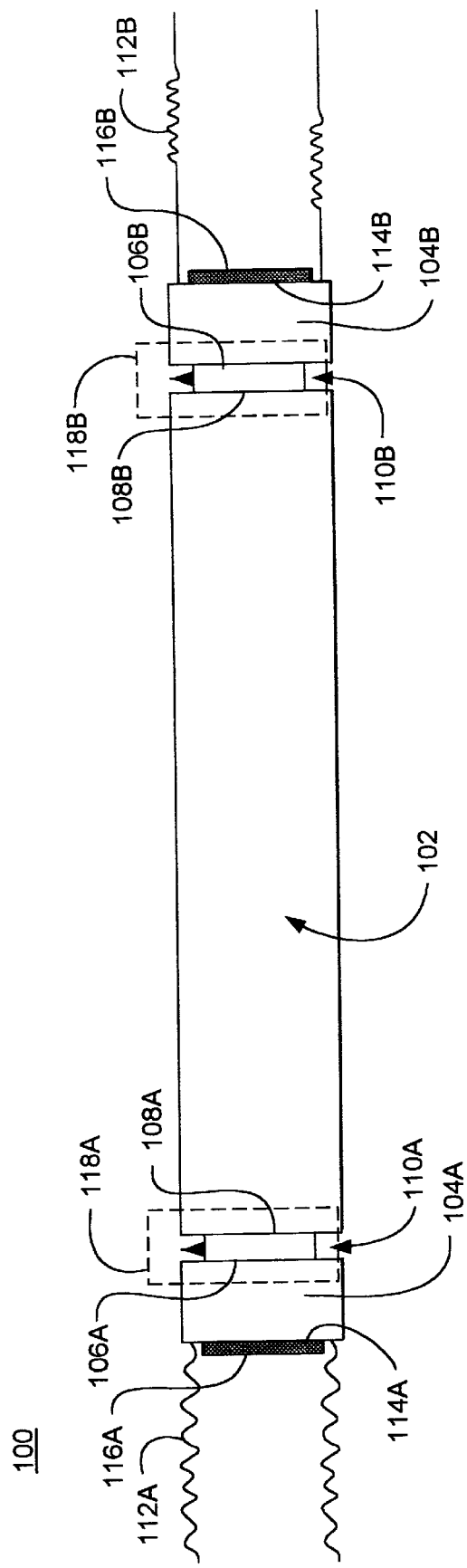
FIG. 2 is an illustration of a crystal isolation housing in which the two end caps form etalons with the faces of the crystal.

Another embodiment of the present invention is shown in FIG. 2. Environmental isolation housing 100 isolates crystal 102 from environmental factors such as humidity and dust. Inside surface 106A of cap piece 104A is held a predetermined distance from crystal face 108A such that an etalon effect exists between inside surface 106A and crystal face 108A. Inside surface 106B of cap piece 104B is held a predetermined distance from crystal face 108B such that an etalon effect exists between inside surface 106B and crystal face 108B. The passbands of these two etalons may be selected to be any appropriate center wavelength and bandwidth. Crystal 102 may be LBO and cap pieces 104 may be F2 glass.

Etalon spacers 110 can be shaped to environmentally isolate crystal faces 108A and B from the environment. For example, spacers 110 can be shaped like a ring, an oval or any other closed shape which isolates crystal faces 108 from the environment. Alternatively, environmental barriers 118A and B can be placed around a perimeter of cap pieces 104 and crystal faces 108 in order to isolate crystal faces 108 from the environment. Environmental barriers 118 can be made from any material that will prevent the passage of deleterious environmental components such as dust and moisture. Examples of suitable materials are some silicones and Teflon.

Etalon spacers 110 can be placed between each inside surface 106-crystal face 108 pair. Etalon spacers 110 may be separate components which are sized to hold inside surface 106 and crystal face 108 a predetermined distance apart. Etalon spacers 110 can also be fabricated out of, attached to, or deposited on inside surfaces 106 or crystal faces 108.

Retaining springs 112A and B may be used to apply pressure to cap pieces 104 so that there is physical contact between inside crystal surface 106A, etalon spacer 110A and crystal face 108A, and between inside crystal surface 106B, etalon spacer 1 OB and crystal face 108B.

The outside surfaces 114A and B of cap pieces 104A and B can also have an antireflection coatings 116A and B coated on them. Reflection losses from the outside surfaces 114A and B of cap pieces 104 can cause undesirable losses. Antireflection coatings may be used to reduce these losses.

Additionally, as discussed above, the portion of crystal 102 not covered by transparent end pieces environmental barriers 118 may be covered with a coating or a material in order to isolate the rest of the crystal from the environment.

Figure 3:
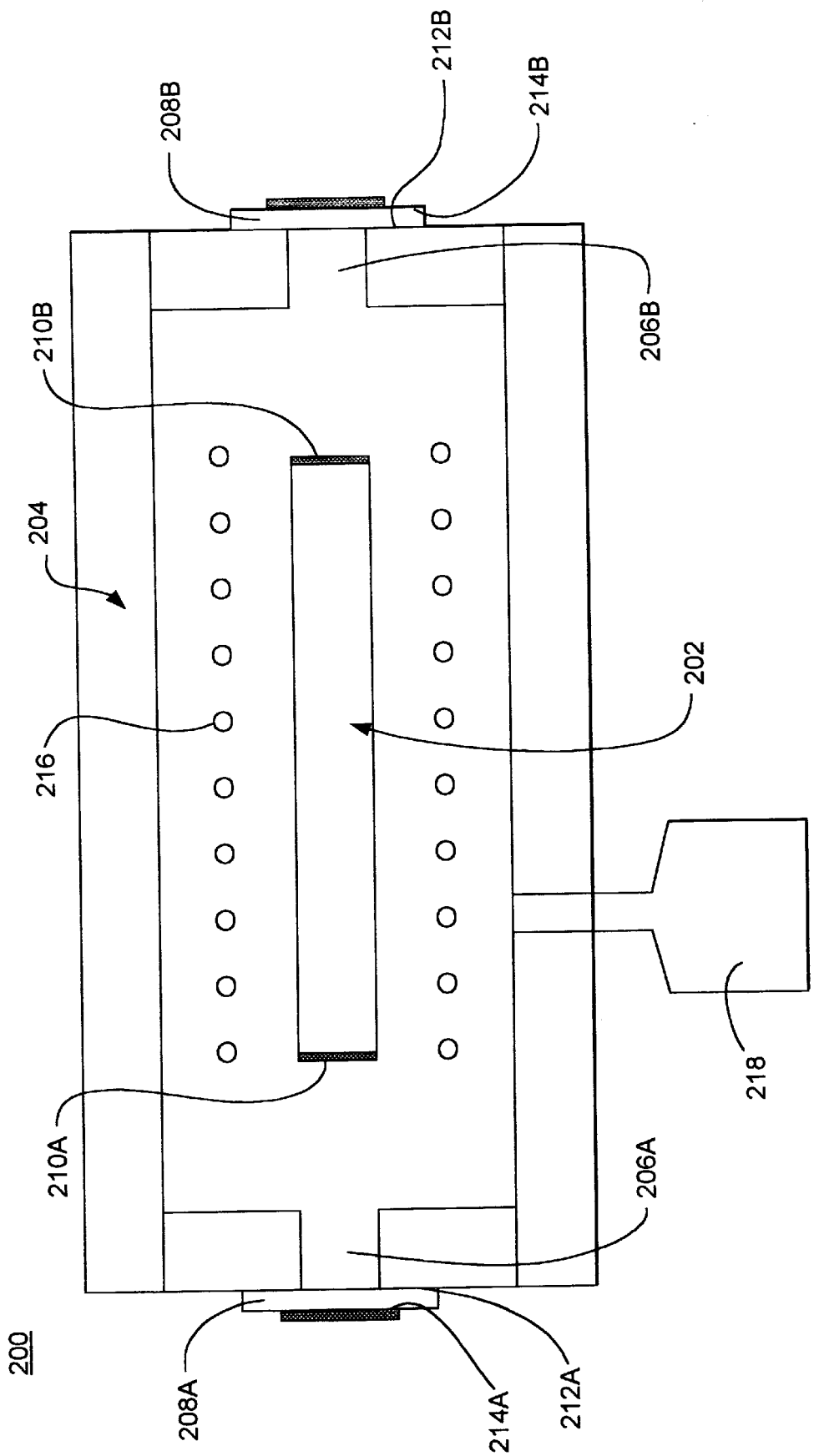
FIG. 3 is an illustration of a crystal isolation housing in which the crystal is placed inside a housing with two end caps.

Another embodiment of the invention is shown in FIG. 3. Environmental isolation system 200 isolates crystal 202 from the environment. Housing 204 is closed to the environment except for two input ports 206A and B. Cap piece 208A is placed over input port 206A and environmentally seals input port 206A. Cap piece 208B is places over input port 206B and environmentally seals input port 206B. Thus, when cap pieces 208 are placed over input ports 206, housing 204 is environmentally isolated.

Crystal 202 is oriented within housing 204 such that crystal face 210A is facing input port 206A and crystal face 210B is facing input port 206B. One or both of the crystal faces 210A and B can be antireflection coated to reduce losses due to reflections from the surfaces of the crystal.

Cap pieces 208 can be antireflection coated. A typical coating that may be used in this regard is available from CVI Laser of Albuquerque, N. Mex. Either or both of the inside surfaces 212A and B of cap pieces 208A and B can be antireflection coated. Additionally, outside surfaces 214A and B of cap pieces 208A and B can also be antireflection coated. Furthermore, it would not depart from the present invention for one or both of cap pieces 208 to be a coated with a reflective coating. Also, one or both cap pieces 208 can be shaped as a lens or a mirror.

Inside faces 212 and outside faces 214 of cap pieces 208 can be slightly angled to prevent etaloning effects with other surfaces. These surfaces can be angled in a variety of ways, including angling the portion of the housing to which the cap pieces are coupled, or wedging the faces of the cap pieces 208. Inside faces 212 and outside faces 214 can also be antireflection coated to reduce reflection losses or they can be coated to act a full or partial reflectors.

Housing 204 can contain oven heater 216 for maintaining the crystal substantially at a specified temperature. Additionally, a desiccator, molecular sieve, or other filtering device 218 can be attached to housing 204. Due to manufacturing imperfections, material choices, design oversights or other effects, housing 204 may not be completely isolated from environmental factors such as moisture, dust or other undesirable elements. Device 216 can be used to remove these unwanted factors that may enter housing 204.

Figure 4:
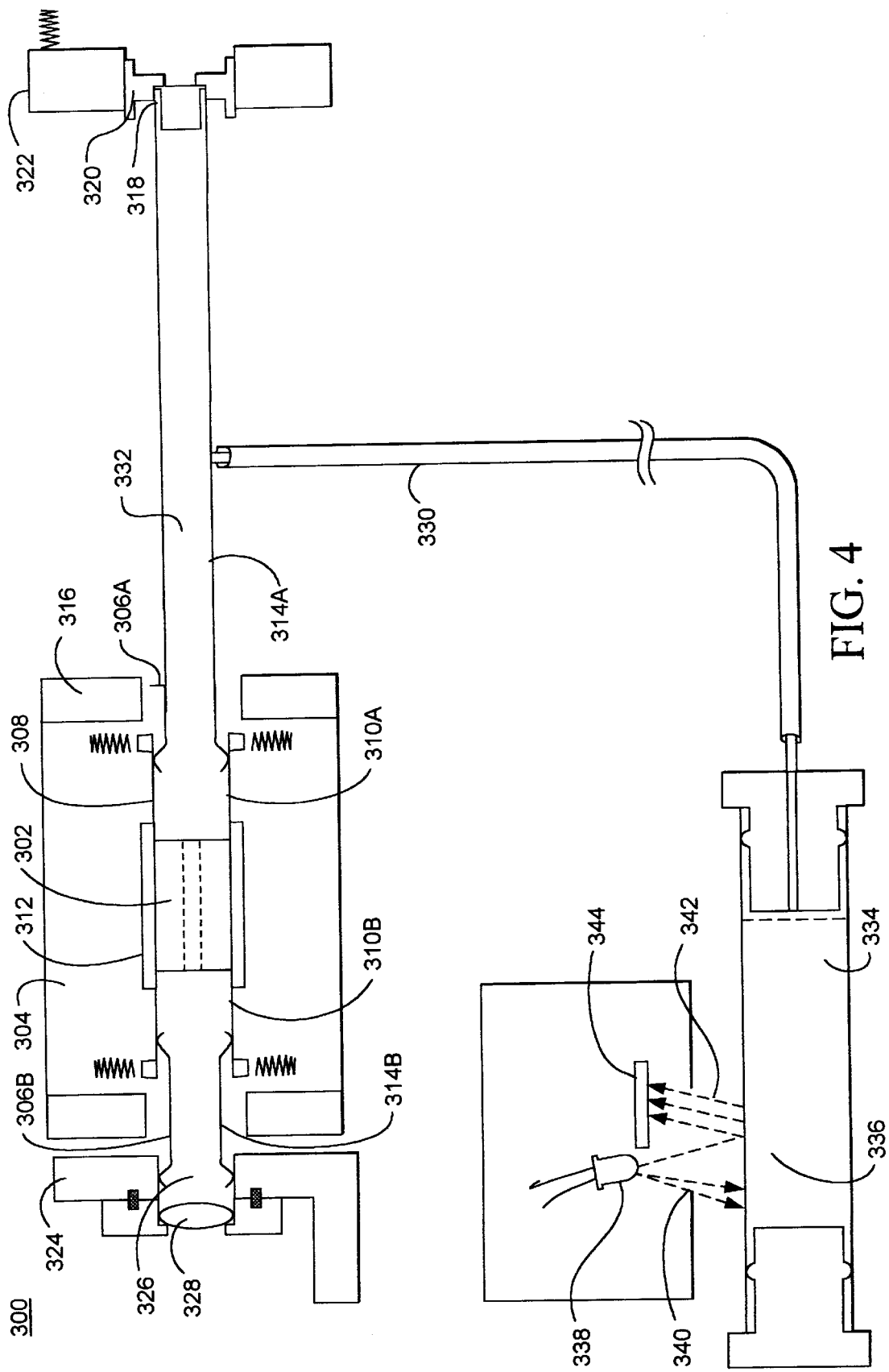
FIG. 4 is an illustration of a crystal isolation housing in which the crystal is placed inside a housing and the end caps are placed at the ends of flexible tubes to allow the system to be more easily aligned to a laser system.

Another embodiment of the present invention is shown in FIG. 4. Environmental isolation housing 300 isolates crystal 302 from undesired environmental factors such as dust and moisture. Housing 304 is closed to the environment except for two input ports 306A and B. Crystal 302 is held in thin metal tube 308 and positioned such that crystal face 310A is oriented towards input port 306A and crystal face 310B is oriented towards input port 306B.

If heater 312 is desired to help temperature tune or temperature stabilize crystal 302, then heater 312 can be placed on the outside of thin metal tube 308. Heater 312 will heat crystal 302 through thin metal tube 308, but because thin metal tube 308 is thin it will have poor thermal conductivity and therefore heat will not be very effectively conducted to other parts of system 300.

Thin metal passage 314A is inserted through input port 306A and into thin metal tube 308. Thin metal tube 308 is held against thin metal passage 314A using adjustment screws 316. Thin metal tube 308 could also be sealed to thin metal passage 314A using a canted coiled spring and seal. The BAL SEALS seals manufactured by Bal Seal Engineering Company, Inc. can be used. Thin metal passage 314B is also sealed to thin metal tube 308 using set screws 316 but a canted coiled spring seal may also be used.

The other end of thin metal passage 3 14A is sealed to cap piece 318 using a canted coiled spring and seal which can be integrated into mounting block 320. Mounting block 320 can further be epoxyed to cap piece 318 and/or thin metal passage 314A. Cap piece 318 can be positioned with respect to the rest of system 300 through the use of mount 322. Thin metal passage 314A should be constructed to allow enough flexure so that cap piece 318 can be aligned to system 300. Cap piece 318 can be any appropriate optical component such as a lens or a mirror.

The end of thin metal passage 314B which is not sealed to thin metal tube 308 is sealed to mounting block 324 blocking one end of passage 326. Thin metal passage 314B can be sealed to mounting block 324 using set screws, a canted coiled spring seal or any other type of seal. The other end of passage 326 is sealed with cap piece 328. Cap piece 328 can be sealed to mounting block 324 using epoxy, a canted coiled spring seal or any other type of seal. Cap piece 328 can be any appropriate optical component such as a lens or a mirror. Thin metal passage 314B should allow enough movement so that cap piece 328 can be aligned with system 300 by manipulating mounting block 324.

Tube 330 is connected to thin metal passage 314A so that the atmosphere 332 contained in system 300 can be communicated down tube 330. Tube 330 could be connected to any other part of the system which would allow access to enclosed atmosphere 332. The other end of tube 330 is connected to desiccator 334. desiccator 334 could be integrated into system 300 without the use of a tube without departing from the present invention.

Desiccator 334 contains desiccant 336 which is used to remove moisture from atmosphere 332. If there are other impurities in atmosphere 332 then other scrubbing devices besides a desiccator can be used. For example, if it is desired to remove dust from atmosphere 332 then desiccator 334 can be replaced by an air filter.

Light source 338 emits light 340 towards desiccator 334. A portion of light 340 is reflected by desiccant 336 in desiccator 334. The reflected light 342 is detected by detector 344. Typically desiccant or an air filter will change color as it is used. Thus, the spectrum and intensity of light reflected from the desiccant will change as the desiccant is used up. For example, when a red LED is used as the light source and DRIERITE type desiccant manufactured by Hammond Drierite Company is used in the desiccator, the intensity of the red light reflected from the desiccator increases by a factor of 2 when the desiccant has been mostly used up. Since the desiccant is typically used up starting from the portion of the desiccator closest to the input tube, one or more LED-detector pairs can be positioned at various points along the desiccator to provide desiccant usage data or appropriate warnings as to how much desiccant has been used up.

Environmental isolation housing 300 may be constructed with small controlled leaks which will equalize the pressure inside and outside the housing in order to avoid misalignment effects. Preferably, desiccator 334 can be constructed to hold enough desiccant 336 to provide long term protection against moisture in the housing despite the small controlled leaks.

The following descriptions are presented to enable any person skilled in the art to make and use the present invention, and is provided in the context of a particular application and its requirements. Various modifications to the preferred embodiments will be readily apparent to those skilled in the art, and the general principles defined herein may be applied to other embodiments and applications without departing from the spirit and scope of the present invention. Thus the present invention is not intended to be limited to the embodiments shown, but is to be accorded the widest scope consistent with the principles and features disclosed herein.

What is claimed is:

1. An environmental isolation housing, comprising:

a crystal having a first face and a second face, and said crystal having a first composition;

a first cap piece with a first side and a second side, said first side of said first cap piece being substantially the same shape as said first face of said crystal and positioned in contact with said first face of said crystal such that atomic bonds are formed between said first side of said first cap piece and said first face of said crystal, and said first cap piece having a second composition, said second composition being substantially distinct in atomic structure from said first composition; and a second cap piece with a first side and a second side, said first side of said second cap piece being substantially the same shape as said second face of said crystal and positioned in contact with said second face of said crystal such that atomic bonds are formed between said first side of said second cap piece and said second face of said crystal, and said second cap piece including having the second composition, wherein said first and second cap pieces cover said ends of said crystal to provide environmental isolation of said crystal.

2. The environmental isolation housing of claim 1, wherein said first cap piece is transparent.

3. The environmental isolation housing of claim 1, wherein said first cap piece is at least partially reflective.

4. The environmental isolation housing of claim 2, wherein said second side of said first cap piece has an antireflection coating on it.

5. The environmental isolation housing of claim 2, wherein said second side of said first cap piece and said second side of said second cap piece both have antireflection coatings.

6. The environmental isolation housing of claim 1, wherein said first cap piece is made of F-Series Schott glass.

7. The environmental isolation housing of claim 1, wherein said first cap piece has an index of refraction within 0.01 or less of an index of refraction of said crystal.

8. The environmental isolation housing of claim 1, wherein said first composition includes Lithium Tri-Borate.

9. The environmental isolation housing of claim 1, wherein said crystal having a first material reacting with water vapor, and said first cap piece and said second piece having a second material not reacting with water vapor.

* * * * *